United States Patent
Cowell Senft et al.

(10) Patent No.: US 8,202,608 B2
(45) Date of Patent: Jun. 19, 2012

(54) ELECTRET COMPOSITION AND METHOD FOR PRINTING

(76) Inventors: Donna S. Cowell Senft, Albuquerque, NM (US); Bianca K. Thayer, Albuquerque, NM (US)

( * ) Notice: Subject to any disclaimer, the term of this patent is extended or adjusted under 35 U.S.C. 154(b) by 1709 days.

(21) Appl. No.: 10/365,865

(22) Filed: Feb. 13, 2003

(65) Prior Publication Data

US 2004/0071999 A1    Apr. 15, 2004

(51) Int. Cl.
 *B32B 7/02* (2006.01)
(52) U.S. Cl. ............ 428/212; 428/411.1; 101/487; 101/489
(58) Field of Classification Search .......... 428/194, 428/195.1, 212, 213, 411.1; 101/212, 487, 101/489
See application file for complete search history.

(56) References Cited

U.S. PATENT DOCUMENTS

| | | | |
|---|---|---|---|
| 3,629,000 A * | 12/1971 | Back et al. ............... 430/67 |
| 5,686,184 A * | 11/1997 | Akamatu et al. ......... 428/32.65 |
| 5,904,985 A * | 5/1999 | Ward et al. ............... 428/32.1 |
| 5,908,723 A * | 6/1999 | Malhotra et al. ......... 430/31 |
| 6,159,325 A * | 12/2000 | Graham et al. ........... 156/250 |
| 6,284,339 B1 * | 9/2001 | Floegel et al. ........... 428/43 |
| 6,372,157 B1 * | 4/2002 | Krill et al. .............. 252/478 |
| 6,660,352 B2 * | 12/2003 | Hsu et al. ................ 428/40.1 |

* cited by examiner

*Primary Examiner* — David Sample
*Assistant Examiner* — Lawrence Ferguson
(74) *Attorney, Agent, or Firm* — Kevin Lynn Wildenstein

(57) ABSTRACT

A printing method and composition that is constructed from an electrostatically charged sheet having a top and bottom surface and a backing sheet. The backing sheet includes a sheet of paper having top and bottom surfaces. The top surface includes a binding material preferably having a dielectric constant greater than that of the paper. The top surface of the backing sheet is in contact with the bottom surface of the electrostatically charged sheet and retained by an attractive force. The binding material is preferably chosen to provide an electrostatic attraction between the electrostatically charged sheet and the backing sheet of approximately between 4 g/inch and 80 g/inch. The charged sheet can be constructed from plastic polymers, while the binding material can be constructed from a mixture of polymers, such as polyethylene, polypropylene, and polyurethane.

18 Claims, 1 Drawing Sheet

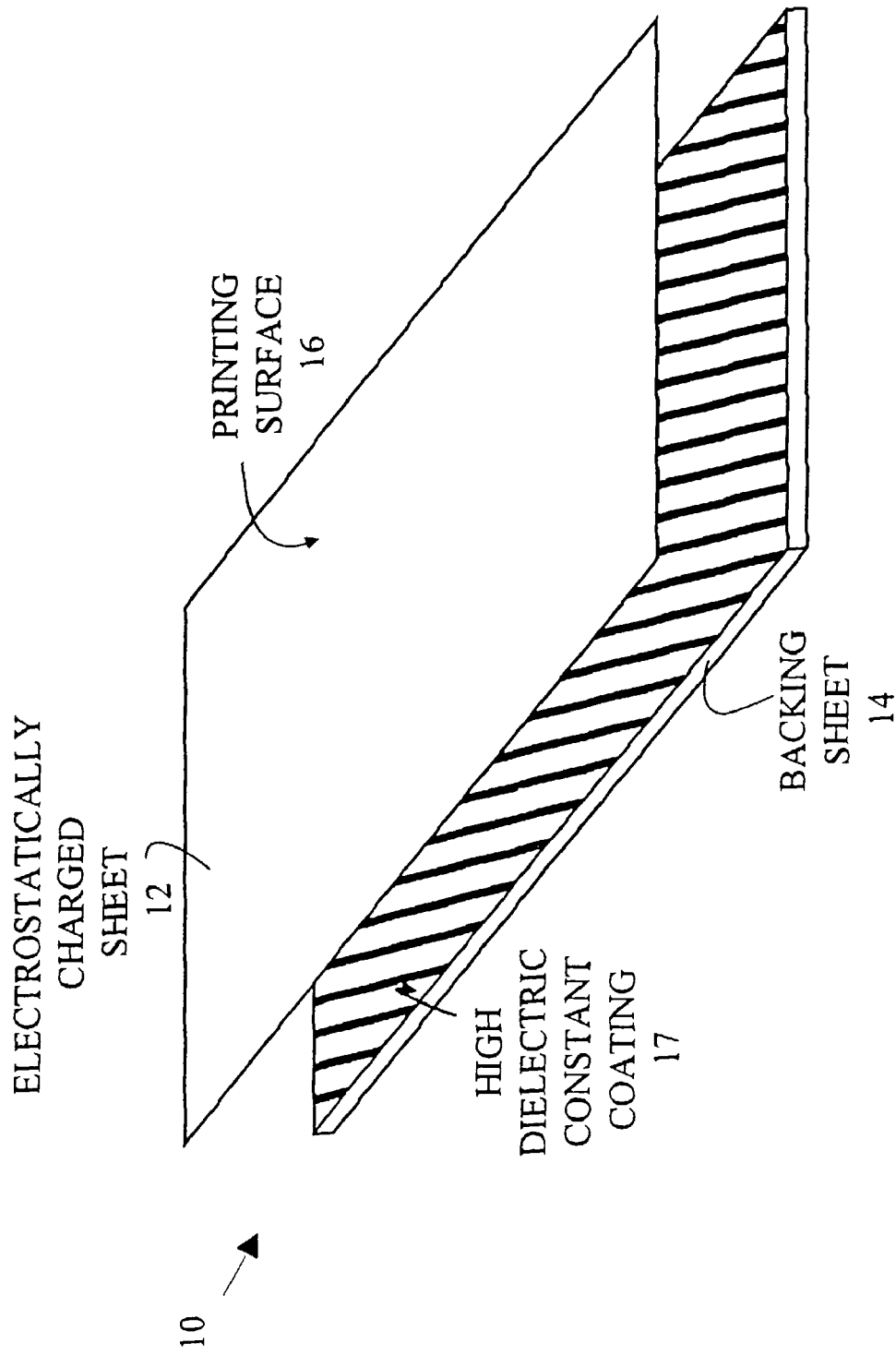

ELECTRET COMPOSITION AND METHOD FOR PRINTING

This invention claims priority based upon U.S. application Ser. No. 09/668,397, filed Sep. 22, 2000.

FIELD OF THE INVENTION

This invention relates generally to printing on polymer electrostatically charged films, and more to an improved printing composition that is better adapted for printing in various printing presses, including high-speed flexographic, digital and wide format ink jet printers.

BACKGROUND OF THE INVENTION

It is common practice to affix printed posters, calendars and the like to a flat, vertical surface, e.g., a wall. The purposes for doing so are wide and varied. For example, there is the college student who wants to decorate his or her dorm walls but cannot afford framed pictures and is prohibited by school authorities from mounting any materials requiring nails to be imbedded in the walls. Like most students, this student will choose to decorate his or her dorm walls by affixing unframed printed posters with tape, tacks, or other adhesive materials.

Posters printed on electrostatically charged plastic films are particularly attractive for advertising and the like. The posters will adhere to a vertical surface for weeks or months without utilizing attachment methods that will damage the wall. The cost of the electrostatically charged material is substantially less than other products such as static cling vinyl which is often used for such purposes. In addition, electrostatically charged sheets will cling to a much larger class of surfaces than static cling vinyl.

The thickness of the plastic sheets is preferably in the range of 0.001 to 0.005 inches. Thin sheets weigh less than thicker sheets, and hence, require less electrostatic charge to stick to a vertical surface. In addition, thin sheets have less material per square foot than thicker sheets, and hence, have lower material costs.

Unfortunately, thin plastic sheets present problems when high speed printing presses are used to print the posters. To prevent stretching and other mechanical problems, the thin charged sheets must be attached to some form of thicker backing sheet that provides dimensional stability as well as stiffening of the article to be printed. The backing sheet also reduces the amount of electrostatic charge that is lost during the printing process and prevents the unprinted side of the sheet from accumulating dust via electrostatic attraction. The usual prior art backing sheet consists of a sheet of paper that is attached to the plastic sheet by an adhesive at the edges of the sheets. The combination of adhesive and electrostatic charge is sufficient to assure that the two sheets do not separate in standard sheet-fed printing presses. After the sheets are printed, the glued portions on the edges can be cut off leaving the charged sheet attached to the backing sheet solely by electrostatic force.

While this methodology has been successful with some forms of printers, there are high speed printers that subject the partially glued sheets to sufficient forces to cause the sheets to delaminate during the printing process, leading to undesirable consequences. In addition, some printing systems, such as flexographic printing presses, operate on relatively narrow widths of stock that lack space for glue strips on the edges. The partially glued sheets also present problems when printed by silk screen techniques.

In addition to causing problems at the printing stage, a poorly bound backing sheet can cause problems when the printed material is bound in magazines and the like. One particularly attractive use for electrostatically charged posters is for advertising. The electrostatically charged poster and backing sheet are bound in magazines with a perforated edge that allows the reader to pull out the poster. The machinery that inserts these inserts can exert sufficient force on the poster to de-laminate the sheets. The de-laminated sheets cause problems with the insertion mechanisms, and hence, cannot be used in this application.

In principle, the electrostatically charged sheet could be glued to the backing sheet over its entire surface by using some form of low-tack adhesive. However, it has been found that such adhesives are transferred to the electrostatically charged sheets, which leads to a charged sheet with substantially reduced electrostatic adhesion properties.

Broadly, it is the object of the present invention to provide an improved backing sheet for electrostatically charged sheets.

It is a further object of the present invention to provide a backing sheet that does not need to be glued to the electrostatically charged sheet, while binding to that sheet with sufficient force to assure that the sheets will not de-laminate during printing, without binding so tightly that the sheets cannot be separated after printing.

The present invention is also directed towards web printing (e.g., printing material or a web from a roll through a printing press and rewound onto another roll) which is known to those of skill in the art as roll to roll printing, or flexographic printing.

Those of skill in the art will come to realize that the present invention may also be applicable to digital printing or wide format ink jet printers. The present invention provides an advantage to the digital or wide format ink jet printing process in that the charged sheet and the backing sheet remain in contact which decreases the possibility of wrinkles or blemishes on the printed charge sheet during the printing process, especially at higher printing speeds.

Those of skill in the art will also come to realize that the present invention can also be used as cut sheets of material. However, use of cut sheets of the present invention which may tend to be more expensive than existing cuts sheets which incorporate a glue or adhesive line between the electrostatically charged sheet and the standard paper backer.

These and other objects of the present invention will become apparent to those skilled in the art from the following detailed description of the invention and the accompanying drawings.

SUMMARY OF THE INVENTION

The present invention is a printing composition that is constructed from an electrostatically charged sheet having a top and bottom surface and a backing sheet. The backing sheet includes a sheet of paper having top and bottom surfaces. The top surface includes a binding material having a dielectric constant greater than that of the paper. The top surface of the backing sheet is in contact with the bottom surface of the electrostatically charged sheet. The binding material is preferably chosen to provide an adhesive force between the electrostatically charged sheet and the backing sheet of approximately between 4 g/inch and 80 g/inch. The binding material can be constructed from a mixture of polymers, such as polyethylene, polyurethane, and polypropylene.

BRIEF DESCRIPTION OF THE DRAWINGS

FIG. 1 is an exploded perspective view of a printing composition 10 according to the present invention.

DETAILED DESCRIPTION OF THE INVENTION

The ideal backing sheet would adhere to the electrostatically charged sheet by electrostatic or chemical attraction with sufficient force to assure that the sheets will not delaminate on passing through the printing presses or magazine insert insertion machinery. In addition, the attraction must not be so great that the sheets cannot be manually separated without damaging the thin plastic poster. Finally, the backing sheet must be inexpensive.

The electrostatic force with which the electrostatically charged sheet is bound to the backing sheet is determined by the dielectric constant of the backing sheet surface that is in contact with the electrostatically charged sheet. In addition, the backing sheet can be held in place by chemically-based adhesion forces. As noted above, a paper sheet does not bind with sufficient force to prevent de-lamination. On the other hand, paper represents the most economical choice of material. Accordingly, the preferred embodiment of the present invention utilizes a paper backing sheet that has been coated with a material with a dielectric constant that is greater than that of the untreated paper and which also interacts electrostatically or chemically with the plastic of the electrostatically charged sheet. In the preferred embodiment of the present invention, the coating material is a mixture of polymers.

In one embodiment of the present invention, the charged sheet is laminated onto the backer by bringing webs of the two materials in contact and applying pressure through a pair of rubber-coated nip rollers. The webs are under elastic tension. As noted above, there are at least two components to the adhesive force, the electrostatic force and the chemical adhesion force. Another component is the applied pressure. The magnitude of the electrostatic force is related to the dielectric constant of the polymer coating on the backer. The magnitude of the chemical adhesion force is related to the surface energy of the two materials, the applied pressure, temperature, and time of contact. In the present application, the bonding is assumed to be limited to relatively weak Van der Waals bonds between the polymers, since the polymers have low surface energies. It should be noted that joining two high surface energy materials by this method can produce permanent adhesion as in a roll-bonding operation. Such permanent adhesion is to be avoided, since the sheets cannot be manually separated.

Refer now to FIG. 1, which is an exploded perspective view of a printing composition 10 according to the present invention. Printing composition 10 is constructed from an electrostatically charged sheet 12 that is in contact with a backing sheet 14. Electrostatically charged sheet 12 has a printing surface 16 which accepts ink during the printing process. Printing surface 16 may include one or more coating layers that aid in the absorption of ink. Such layers are particularly useful when water-based inks such as those utilized in inkjet printers are used. In one embodiment, the charged sheet 12 is formed from a plastic polymer, such as polyethylene, polypropylene or polyester.

Backing sheet 14 is coated with a high dielectric constant material 17 on the side that makes contact with electrostatically charged sheet 12. The dielectric constant and chemical composition must be chosen such that the binding force is in the correct range for the printing and insertion machinery, while not being so great that the electrostatically charged sheet 12 cannot be removed manually from backing sheet 14 without damaging electrostatically charged sheet 12. In the preferred embodiment of the present invention, a mixture of polymers is utilized for the coating. For example, a mixture of polyethylene, polypropylene, and polyurethane, can be utilized. The ratio of the polymers to one another in the mixture determines the dielectric constant of the resulting coating. The dielectric constant is adjusted such that the binding force between electrostatically charged sheet 12 and backing sheet 14 is approximately between 4 g/inch and 80 g/inch. The adhesion between the backer sheet and the thin charged sheet can be measured by a peel test as described in ASTM D1876-95. In this test, the force (e.g., peel force or peel strength) required to remove the charged sheet from the backer at a 180 degree angle is measured. The results are reported in grams of peel force per inch of width of the sample. Since the binding force also depends on the degree to which the electrostatically charged sheet is charged, the ratio of polymers that provides the correct binding force will depend both on the material from which the electrostatically charged sheet 12 is constructed and the degree to which that material was charged.

In addition to providing improved binding of the electrostatically charged sheet to the backing sheet, the high dielectric coating provides another advantage. It is found experimentally, that when the electrostatically charged sheet is separated from the backing sheet, additional charge is transferred to the electrostatically charged sheet. That is, the act of separating the two sheets actually increases the electrostatic charge on the electrostatically charged sheet. This increase in charge is believed to result from the chemical interaction of the backing sheet and the electrostatically charged sheet. The relative magnitudes of the chemical and electrostatic adhesions can be estimated from the increase in adhesion observed after the sheets have been in contact with one another for some period of time. For example, after aging for 70 hours at 52° C., the adhesion measured by the peel test increased by a factor of between two and three over an unaged sample. Since the electrostatic attraction does not change with heat, the increase is due to the chemical attraction.

The preferred thickness of the backing sheet is determined by the requirements of the printing or insertion handling machinery. Thin sheets have the advantage of lower cost; however, there is a minimum thickness that must be maintained for the sheets to be processed by the machinery. In one embodiment of the present invention, the backing sheet has a thickness between approximately 2 mil and 10 mil (i.e., 0.002 inches and 0.010 inches), so that the combined thickness of the charged sheet and the backing sheet is approximately between 3 mil and 15 mil (i.e., 0.003 inches and 0.015 inches).

As noted previously, the electrostatically charged sheet can be constructed from a number of different materials or plastic polymers. The production of electrostatically charged sheets from polyester, polyethylene or polypropylene films is well known in the electret arts. Polyester films that have been coated to provide an ink absorbent surface for printing in inkjet printers are also known to the printing arts. This material is used in conventional printing presses to generate posters and packaging materials. For example, polyester film with an acrylic coating suitable for printing may be obtained from Apollo Presentation Products, Ronkonkoma, N.Y. 11779. Similar films are sold for generating transparencies typically used in inkjet printers. Polyester sheets of this type may be charged by placing the sheets in an electric field which is typically 10,000 volts/cm. The sheets may be heated to increase the remnant electric field. In the preferred embodiment of the present invention, a polyester film having a thickness between 0.001 inches and 0.006 inches is passed between rollers and subjected to an electric field and corona discharge to charge the film. This film is then backed with backing sheet 14 by bringing the two sheets in contact with one another. However, other films based on polypropylene, with or without coatings, can be utilized.

Various modifications to the present invention will become apparent to those skilled in the art from the foregoing description and accompanying drawings. Accordingly, the present invention is to be limited solely by the scope of the following claims.

What is claimed is:

1. A printing laminate material comprising:
    an electrostatically charged sheet having a top and a bottom surface; and
    a backing sheet comprising a sheet of paper having a top and a bottom surface, said top surface comprising a binding material having a dielectric constant greater than that of said paper, said top surface of said backing sheet being in contact with said bottom surface of said electrostatically charged sheet.

2. The printing laminate material of claim 1, wherein said binding material comprises a mixture of polymers.

3. The printing laminate material of claim 2 wherein said mixture of polymer comprises polyethylene, and polypropylene polyurethane and like polymers.

4. The printing laminate material of claim 1 wherein said binding material is chosen to provide an attraction between said electrostatically charged sheet and said backing sheet of approximately between 4 g/inch and 80 g/inch.

5. The printing laminate material of claim 1 wherein said electrostatically charged sheet comprises polyethylene, polypropylene or polyester.

6. The printing laminate material of claim 1 wherein said electrostatically charged sheet has a thickness of approximately between 0.001 inches and 0.006 inches.

7. The printing laminate material of claim 1 wherein said sheet of paper has an approximate thickness of 0.002 inches and 0.010 inches.

8. A printing laminate material for use in a printing process, the composition comprising an electrostatically charged sheet having a top surface and a bottom surface, a backing sheet comprising at least a top surface, the charged sheet being adjacently coupled to the top surface of the backing sheet by an attractive force sufficient to prevent uncoupling during the printing process while preventing permanent adhesion between the charged sheet and the backing sheet.

9. The laminate material of claim 8, the charged sheet top surface being adapted to accept and retain ink.

10. The laminate material of claim 9, the attractive force comprising at least an electrostatic force and a pressure force.

11. The laminate material of claim 10, the attractive force being set at approximately between 4 g/inch and 80 g/inch.

12. The laminate material of claim 9, the combined thickness of the charged sheet and the backing sheet being approximately between 0.003 inches and 0.015 inches.

13. A printing laminate material for use in a printing process, the composition comprising an electrostatically charged sheet having a top surface and a bottom surface, a backing sheet comprising at least a top surface, the charged sheet being laminated to the top surface of the backing sheet by an adhesion force sufficient to prevent delamination during the printing process while preventing permanent adhesion between the charged sheet and the backing sheet.

14. The laminate material of claim 13, the charged sheet top surface being adapted to accept and retain ink.

15. The laminate material of claim 14, the adhesion force being created by a pressure force and surface energies between the charged sheet being laminated to the top surface of the backing sheet.

16. The laminate material of claim 15, wherein the adhesion force is created by a dry adhesive.

17. The laminate material of claim 16, wherein the adhesion force created is between 4 g/inch and 80 g/inch.

18. The laminate material of claim 17, the combined thickness of the charged sheet and the backing sheet being approximately between 0.003 inches and 0.015 inches.

* * * * *